United States Patent [19]

Gill

[11] Patent Number: 5,224,726
[45] Date of Patent: Jul. 6, 1993

[54] QUICK ACTION SADDLE POST CLAMP

[76] Inventor: George H. Gill, 206 Russell St., Winters, Calif. 95694

[21] Appl. No.: 756,527

[22] Filed: Sep. 9, 1991

[51] Int. Cl.$^5$ .................. B62K 15/00; B62J 1/00; F16D 1/12
[52] U.S. Cl. .................... 280/287; 280/220; 280/278; 297/195; 403/104; 74/501.5 R; 74/502.2; 74/489
[58] Field of Search .............. 280/287, 220, 87.05, 280/278, 281.1, 274; 297/195; 248/316.2, 218.4; 403/104, 374; 74/531, 527, 500.5, 501.5 R, 502.2, 489 R

[56] References Cited

U.S. PATENT DOCUMENTS

| | | | |
|---|---|---|---|
| 3,849,008 | 11/1974 | Boucher et al. | 403/104 |
| 3,861,740 | 1/1975 | Tajima et al. | 297/195 |
| 4,120,512 | 10/1978 | Newlands | 280/281 R |
| 4,150,851 | 4/1979 | Cienfuegos | 280/278 X |
| 4,826,192 | 5/1989 | Borromeo | 297/195 X |
| 4,872,696 | 10/1989 | Gill | 280/281.1 |
| 5,044,592 | 9/1991 | Cienfuegos | 297/195 X |

FOREIGN PATENT DOCUMENTS

| | | | |
|---|---|---|---|
| 2824974 | 7/1978 | Fed. Rep. of Germany . | |
| 470907 | 6/1914 | France | 280/287 |
| 703798 | 2/1954 | United Kingdom | 280/278 |

*Primary Examiner*—Russell D. Stormer
*Assistant Examiner*—Florian Zeender

[57] ABSTRACT

An improved, self energizing bicycle saddle post clamp easily operated by local or remote control from a handlebar lever. The design is self energizing, with holding action increasing with load. No adjustment is required; small variations in post size or wear are self compensating. Basically only one simple moving part is involved.

4 Claims, 3 Drawing Sheets

5,224,726

QUICK ACTION SADDLE POST CLAMP

This invention relates to clamping and unclamping a bicycle saddle post rapidly and with minimal force, thus facilitating its operation by remote control.

This invention is related to and is an improvement over the saddle post clamp disclosed in my invention 4,870,696 in that the locking action is self energizing and requires no force adjustment.

These and other advantages of the invention will be disclosed when the following description is read with reference to the accompanying drawings.

BACKGROUND ART

The conventional method of clamping the saddle post in the bicycle frame downtube is to split the down tube at the top for several inches, then placing a clamp around the tube which has a through bolt which when tightened, compresses the split down tube against the saddle post to retain it.

Often the clamping action is accomplished by two bosses welded to the opposite sides of the slot. The clamp bolt passes through the two bosses.

Often the clamping action is accomplished by a camming lever as illustrated in Hon's patent U.S. Pat. No. 4,067,586, sheet 4, FIG. 10.

In my patent U.S. Pat. No. 4,872,696, I use a folded over center toggle mechanism to produce the required clamping force which can amount to 2 to 3 thousand pounds. It is the saddle post maximum load divided by the metal to metal friction coefficient of the area under the clamp.

Baucher, U.S. Pat. No. 3,848,008, and Newlands, U.S. Pat. No. 4,120,512, cited in my patent, are bolt actuated variations without the usual bosses and cannot be quickly loosened or tightened.

Of the quick adjusting saddle patents, that of Girardt Fils (French 578,011) consists of a sliding bolt in the bicycle horizontal frame tube engaging a series of notches in the saddle post, the bolt being engaged in the notches by a spring and released by a chain extending to the handlebars, where it is pulled by a lever.

Weinzierl (German 28 24 974) employs a sliding horizontal plate to engage notches in the seat post. The plate is moved by a cable actuated bellcrank.

Walters, in (U.K. Patent 2,116128) discloses a similar horizontal bolt entering a series of holes in the saddle post tube into which the bolt is moved by a means not shown. A spring within the downtube urges the post upward when there is no weight on the saddle.

Cienfuegos (U.S. Pat. Nos. 4,150,851 and 5,044,592) uses a similar horizontal spring loaded bolt engaging holes in the saddle post.

Cardon (Fr. 470,907) also uses a spring loaded bolt engaging holes in the saddle post.

All these embodiments produce stepwise movement, limited by the spacing of the slots or holes, also the saddle post tube must be positioned within about one half of the slot or hole diameter, otherwise the bolt will not enter fully. If the bolt is not entered fully, a not easily checked condition when the rider sits down, the bolt may slip, giving a disconcerting jounce to the rider. This could be hazardous in a turn at high speed.

Cutting the numerous slots or holes can be expensive as they must be burr free to operate properly.

Tajima, U.S. Pat. No. 3,861,740, discloses a hydraulically operated oil cylinder which is forced upward by a compressed gas chamber. The operation is controlled by a small oil valve controlled by a cable to the handlebar.

This embodiment produces the desired action for the saddle post, but it is complicated, expensive, and subject to oil leakage.

Phillips (G.B. 703,798) discloses a vertical slot formed in the body of the seat post, in which a double lobed cam is rotated. When the cam is rotated, it expands the seatpost to frictionally engage the interior of the frame downtube. Infinitely variable positions are available, but the price is a specially formed saddle post as well as the mounting of the cam mechanism on the bicycle frame. Also sufficient force must be exerted in rotating the cam to expand the saddle post tube as well as developing adequate frictional drag to prevent movement of the saddle post in the down tube.

SUMMARY OF THE INVENTION

My invention operates on a different manner than all the above cited art. There are no steps in the height adjustment. A very small movement of the operating means locks and unlocks the saddle post. It will not release as long as any load is on the saddle post, and the locking force increases as the load on the post increases.

No critical adjustment of the locking element is required.

The invention may be adapted to new frames, or as an addition to an old one (Retrofit).

LIST OF DRAWINGS

DESCRIPTION OF THE INVENTION

The preferred embodiment of the invention is now described.

Figure 1:
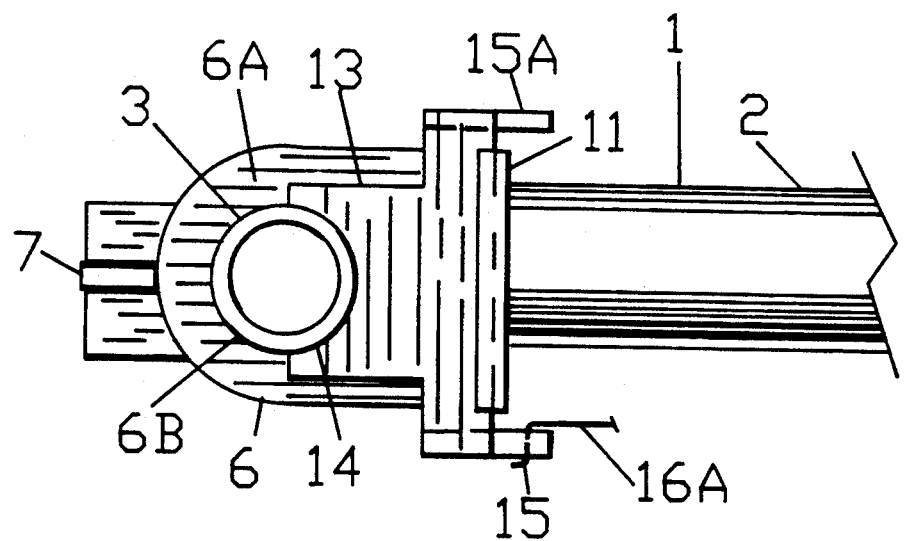
FIG. 1 is a top view of the invention positioned on the saddle post vertical riser tube.
Figure 2:
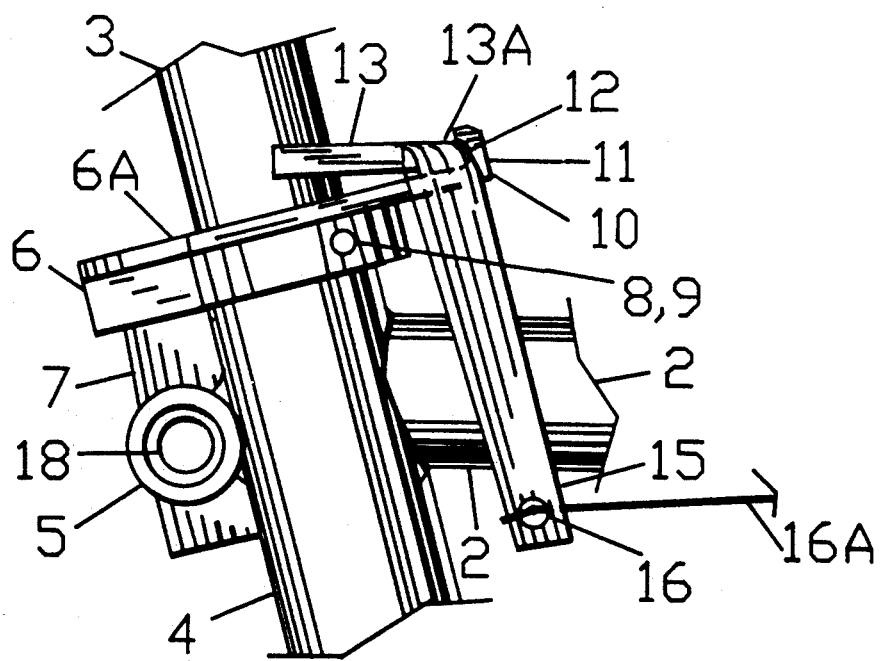
FIG. 2 is a side view of the invention.

In FIG. 1 and FIG. 2, a bicycle frame 1 is shown only at the intersection of the horizontal tube 2 and the vertical saddle post riser tube 4. Numeral 3 is the saddle post itself inserted into the vertical tube 4. Normally two bosses 5 are welded to the tube 4 on opposite sides of a slot 4A (Shown in sectional view FIG. 4) and contain a clamping bolt (Not shown) which is tightened to clamp the saddle post 3.

Figure 4:
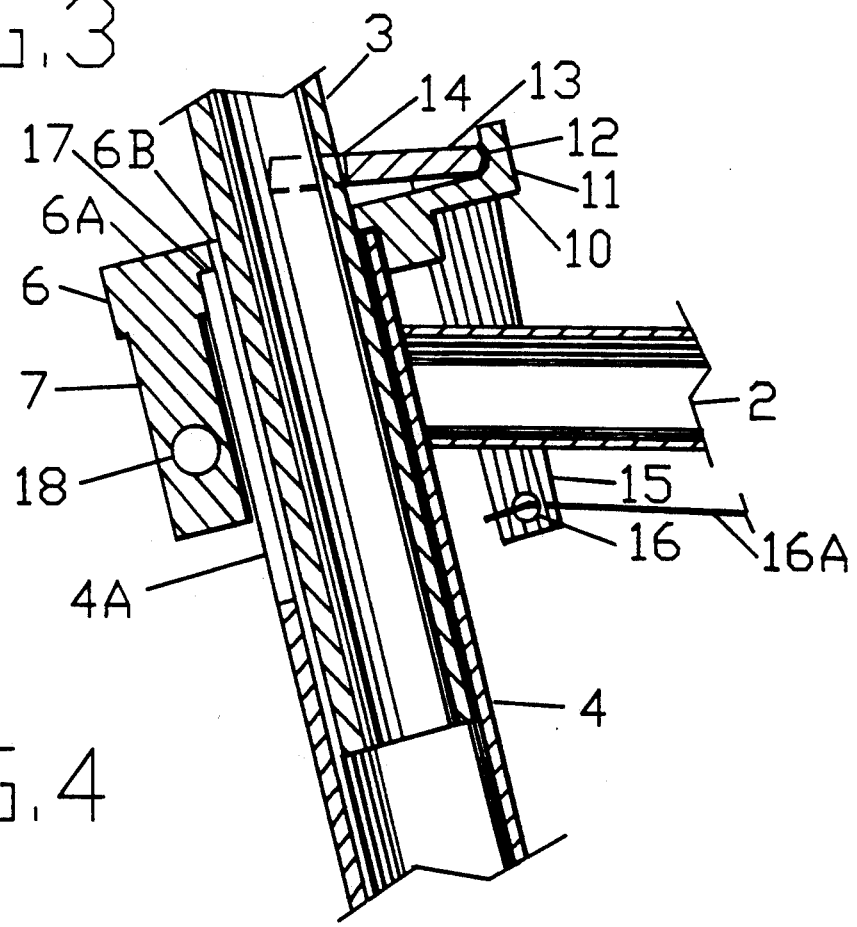
FIG. 4 is a sectional view of the invention.

Also as is best shown in FIG. 4, the invention consists of a body 6 seated over the top of saddle post 4 that is aligned by a recess (shown as 17 in the sectional FIG. 4). The saddle post 3 passes freely through a hole 6B in the body 6 thence into the interior of the vertical tube 4.

A downwardly projecting lug 7 which is actually an extension of the body 6 passes in between the bosses 5 on the tube 4.

A hole 18, shown in FIG. 4 is drilled in the lug 7 in alignment with the holes in the boss 5 during assembly.

The body 6 may also have one or more setscrews 9 in tapped holes 8 which help hold the top of the tube 4 as shown in FIG. 2.

Body 6 also has a projecting shelf 10 which terminates in an upward extension 11 having a rounded groove 12 in the face toward the saddle post 3.

A freely floating clamping plate 13 is positioned in the rounded groove 12, and has at its opposite end, a semicircular cutout 14 partially enveloping the saddle post 3. The cutout is of a slightly larger radius than that of the saddle post 3.

One or both sides of the plate 13 are formed downwards to form levers 15 and 15A. At the lower extreme of the lever 15 is a hole 16, whereby an operating means 16A may be attached thereto.

Figure 3:
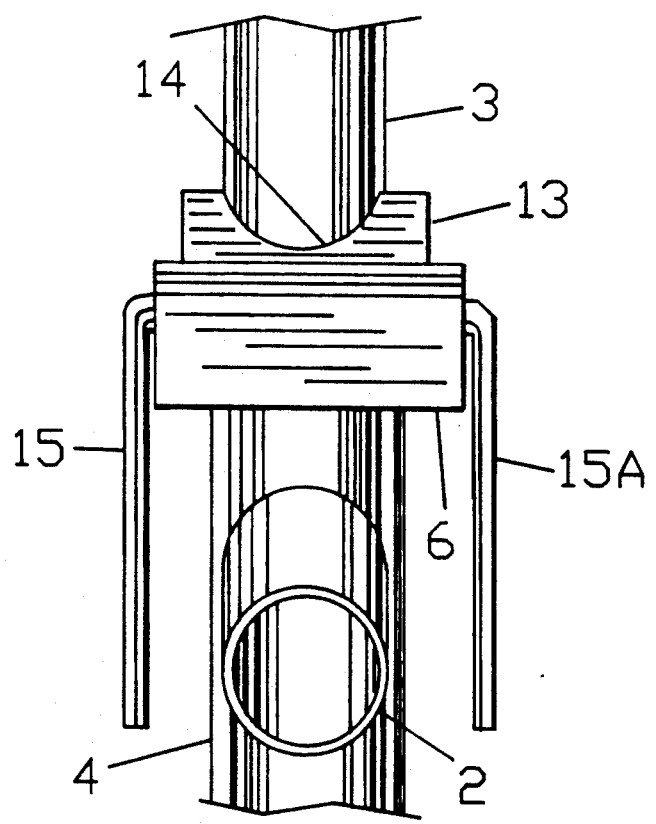
FIG. 3 is a front view of the invention.

FIG. 3 illustrates how the semicircular cutout partially envelopes the saddle post 3 when the latter is inserted into the vertical tube 4.

FIG. 4 is a section of the invention through the center of the horizontal tube 2 and the vertical tube 4 that further illustrates the quiescent positioning of the various parts.

Figure 6:
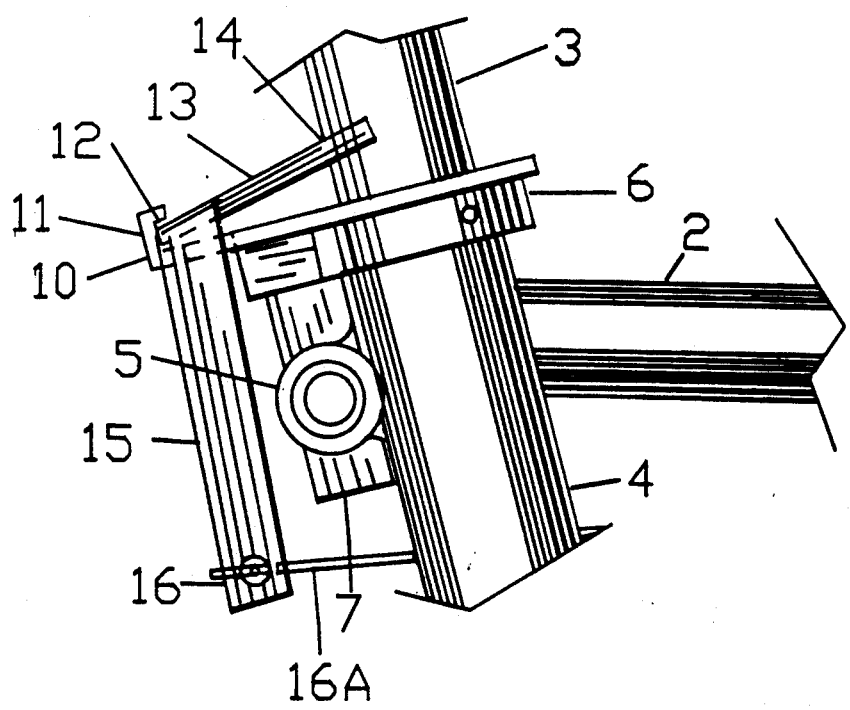
FIG. 6 is a pull release variation.

A slight variation of the invention is illustrated in FIG. 6 wherein a small handle 16B replaces the remote operator 16A.

FIG. 6 is another modification of the original invention wherein the body 6 is adapted for direct welding or brazing to the vertical tube 4 by means of a recess 17 fitting snugly over the top of the tube 4. The lug 7 illustrated in FIG. 2 is not required in this embodiment. Also the setscrew 9 and tapped hole 8 are not now needed.

Figure 5:
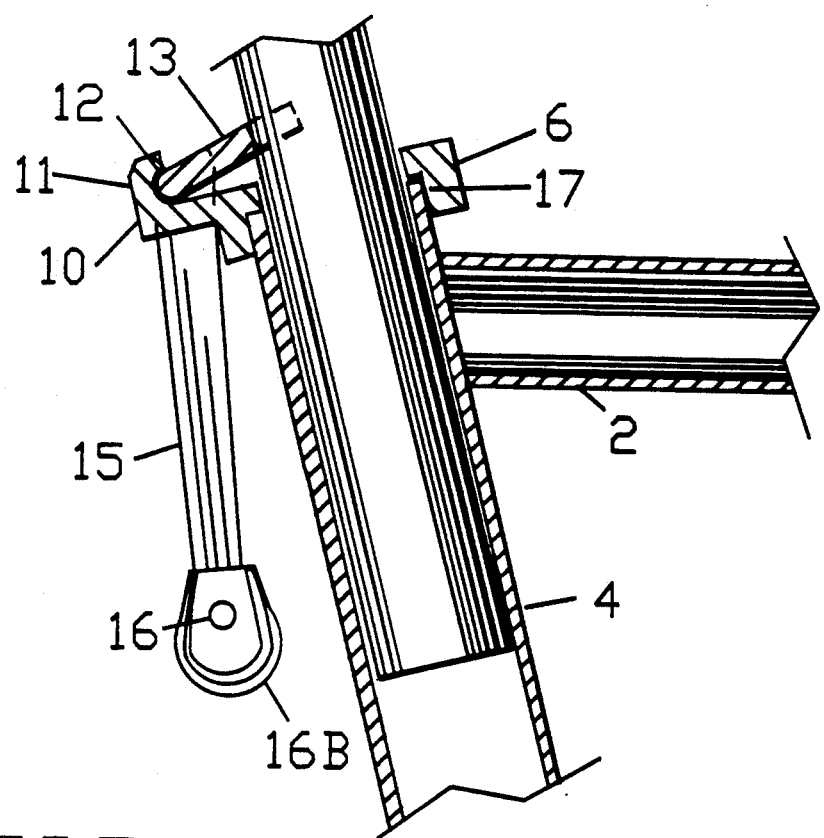
FIG. 5 is a section of a braze-on version.

In FIG. 5, another embodiment of the invention is shown in which the operating lever 15 is placed to the rear of the frame vertical tube 4. All parts are essentially the same as described previously except for the form of the body 6.

OPERATION OF THE INVENTION

Please refer first to FIG. 4. The clamping plate 13 is of such a length that when the semicircular cutout 14 is resting against the saddle post 3, and the other end 13A is resting in the rounded groove 12 in body 6, the plate sets at a small angle from 3 to 10 degrees above the top 6A of the body 6. Any downward pressure on the saddle post 3 jams the plate 13 against the saddle post 3 and the groove 12. Also the post 3 is jammed against the side of the hole 6B in the body 6, so preventing further movement of the post downward. The more the pressure, the tighter the clamping action.

The post can be pulled upward as this movement releases the clamping action of the plate 13. But in order to move the saddle post downward, it is necessary to exert a force to the left on the lower end of lever 15 or 15A, so rotating the plate 13 clockwise away from the post 3; the plate 13 and both the levers 15 and 15A being an integral piece. Now the saddle post 3 is free to move either up or down.

However, when the lever 15 is forced to the right, and the plate 13 is rotated counterclockwise, the semicircular cutout 14 engages the post 3 and locks it, at least lightly. Now when any downward pressure is placed on the saddle post, the self-energizing action takes place and jams the post 3 into the edge of the plate 13 and against the side of the hole 6B.

The right and left acting forces described above are normally applied by a push-pull cable 16A attached to the lever 15 at the hole 16. There are a number of types of these cables, and the details of such cables are not part of this invention and are not shown. Also, in a practical embodiment, a spring either inside of the saddle post tube or external to it is employed to raise the post when the rider removes his weight from the saddle. This is also not part of this invention and is not shown.

This invention is intended for aftermarket as well as new bicycle frames so in order to provide for the normal construction of most older frames, which have the downtube slotted at the top, with two clamping bosses (FIG. 2, item 5) welded to the slot 4A sides, the invention is provided with a downwardly projecting lug 7 which extends down through the slot 4A in the vertical tube and between the bosses 5, and a recess 17 which fits over the top of the downtube 4.

When the body 6 is placed on the downtube end, and the lug 7 is fitted between the bosses 5, a hole 18 is drilled in the lug 7 for passage of the normal clamping bolt used in the bosses 5.

Also one or more threaded holes 8 may be provided in the sidewall of the body 6 wherein setscrews 9 may be inserted and tightened against the top of the downtube 4.

Also, since the saddle post 3 must slide freely in the downtube 4 it may be necessary to add washers or shims between the lug 7 and the bosses 5 as one skilled in the art may determine.

When the downtube is not slotted, or does not have bosses, as is the case with a new frame, the modification of FIG. 6 may be welded or brazed to the top of the downtube. This modification uses a simple recess 17 in the bottom of the body 6 and eliminates the lug 7 and the threaded holes 8 and the setscrews 9.

Many available actuators to operate a device such as my invention are more able to pull rather than push, and as the actuator operator is at the front end of the bicycle, the embodiment shown in FIG. 5 releases the clamping plate 13 by means of a forward pull at the hole 16 in lever 15, thus rotating the plate 12 counterclockwise away form the saddle post 3. All of the other parts are essentially the same and have the same function as those previously described in FIGS. 1, 2 and 3.

Also shown in this FIG. 6 is the substitution of a small handle 16B for the remote actuator, whereby the mechanism may be operated from this point if desired.

Thus one may see that the saddle post clamp of my invention is very simple, having basically one moving part, requires no adjustment, is positively locking yet requires very little force to release it. The only critical surface is that contacting the saddle post; it must be smooth and free of burrs. Parts are retained by an interlocking assembly, and only in the case of a retrofit will separate fasteners be required.

I claim:

1. A bicycle saddle post clamp wherein a saddle post telescopes within an essentially vertical frame tube comprising,
   a body surrounding the top of said frame tube and firmly attached thereto,
   said body having a clearance hole therein through which said saddle post enters said frame tube,
   said body at one end having an upward extension having a height of about one half of said frame tube's diameter and extending substantially parallel to the tube and spaced a distance away from said clearance hole,
   said extension having a rounded groove crosswise to said tube and on the side of said extension that faces said tube,
   a plate having one end resting in said rounded groove,
   the other end of said plate having a semicircular cutout partially enveloping the outside of said saddle post,
   the portion of the plate between said one end and the semicircular cutout having a length somewhat longer than the corresponding distance between said rounded groove in the extension and said clearance hole.

means to rotate said plate in said groove away from the outside of said saddle post.

2. The invention of claim 1, wherein said body has an extension lug projecting downward between the bosses and the slot situated at the top of existing bicycle frame tubes constructed in the manner of present art.

3. The invention of claim 1 wherein said rotating means comprises a downwardly projecting lever,
said lever having means on the lower end to attach a handle or a remote operating means, whereby said plate may be rotated into contact with the outside of said saddle post or away therefrom.

4. The invention of claim 1 wherein said body is welded or brazed to said frame tube.

* * * * *